(12) United States Patent
Bin Mohamad Ibrahim et al.

(10) Patent No.: US 8,895,477 B2
(45) Date of Patent: Nov. 25, 2014

(54) METHOD FOR PREPARING A GELLING AND VISCOSIFYING AGENT FOR DRILLING MUD AND THE PRODUCT THEREOF

(75) Inventors: Mohamad Nasir Bin Mohamad Ibrahim, Pulau Pinang (MY); Mohamed Rashid Ahmed Mohamed Haras, Pulau Pinang (MY); Coswald Stephen Sipaut, Sabah (MY)

(73) Assignee: Universiti Sains Malaysia, Pulau Pinang (MY)

( * ) Notice: Subject to any disclaimer, the term of this patent is extended or adjusted under 35 U.S.C. 154(b) by 464 days.

(21) Appl. No.: 13/382,489

(22) PCT Filed: Oct. 21, 2009

(86) PCT No.: PCT/MY2009/000174
§ 371 (c)(1),
(2), (4) Date: Jan. 5, 2012

(87) PCT Pub. No.: WO2011/028091
PCT Pub. Date: Mar. 10, 2011

(65) Prior Publication Data
US 2012/0122738 A1 May 17, 2012

(30) Foreign Application Priority Data

Sep. 7, 2009 (MY) .............................. PI20093703

(51) Int. Cl.
*C09K 8/20* (2006.01)
*C08H 7/00* (2011.01)
*C09K 8/035* (2006.01)
*C08H 8/00* (2010.01)

(52) U.S. Cl.
CPC *C09K 8/035* (2013.01); *C08H 6/00* (2013.01); *C08H 8/00* (2013.01)

USPC ........................................... 507/106; 527/400

(58) Field of Classification Search
CPC ..................................... C09K 8/20; C08H 7/00
See application file for complete search history.

(56) References Cited

U.S. PATENT DOCUMENTS

| 3,682,856 | A | * | 8/1972 | Adams et al. | .................. 524/702 |
| 4,374,738 | A | | 2/1983 | Kelley | |
| 4,871,825 | A | * | 10/1989 | Lin | ............................... 527/400 |
| 5,037,931 | A | | 8/1991 | Meister | |
| 2003/0149206 | A1 | * | 8/2003 | Tomita et al. | .................. 526/227 |

FOREIGN PATENT DOCUMENTS

GB         2210888         6/1989

OTHER PUBLICATIONS

Ibrahim et al, "Lignin Graft Copolymer As Mud Thinner for Deep Well Drilling Operation." Journal of Applied Sciences 2006, 6(12) pp. 2593-2598.

* cited by examiner

*Primary Examiner* — Randy Gulakowski
*Assistant Examiner* — Jeffrey Washville
(74) *Attorney, Agent, or Firm* — Preston Smirman; Smirman IP Law, PLLC

(57) ABSTRACT

A method for preparing lignin graft copolymer comprising: reacting lignocellulosic materials with an acrylic compound by bulk condensation under nitrogen atmosphere in the presence of a non-oxidizing strong organic acid as catalyst; separating the reaction mixture to obtain a solid phase mainly containing lignocellulosic materials and a liquid phase containing lignin graft copolymer and unreacted acrylic compound; and removing solvent from the liquid phase to obtain the lignin graft copolymer.

13 Claims, No Drawings

__US 8,895,477 B2__

METHOD FOR PREPARING A GELLING AND VISCOSIFYING AGENT FOR DRILLING MUD AND THE PRODUCT THEREOF

CROSS-REFERENCE TO RELATED APPLICATION

The instant application is a national phase of, and claims priority to, PCT International Application No. PCT/MY2009/000174, filed on Oct. 21, 2009, pending, and Malaysian Patent Application No. P1 20093703, filed Sep. 7, 2009, pending, the entire specifications of both of which are expressly incorporated herein by reference.

FIELD OF INVENTION

The present invention relates to a method for preparing an additive for drilling mud and the product thereof. In more particular, the present invention provides an innovative method for preparing lignin graft copolymer (LGC) as a gelling and viscosifying agent for drilling mud and a composition of drilling mud containing this gelling and viscosifying agent.

BACKGROUND OF THE INVENTION

As hydrocarbon wells are developed, chemicals are often used throughout the process ranging from drilling, fracturing, completions, acidizing and work over. In drilling process alone for example, there are varieties of polymeric gelling and viscosifying agents one should choose from in order to enhance the rheological and gelling properties of the drilling mud.

Formulation of drilling fluids or drilling mud is one of the most important aspects in drilling engineering. This is because the drilling fluids are capable of lubricating and cooling the drill bit and drill string as well as carrying cuttings out of the borehole. All of these functions require appropriate viscosity of drilling fluids to facilitate pumping, circulate the cuttings and transfer them to the surface. Apart from that, adequate gelling property of the drilling fluids is also required to prevent drill cuttings from settling down at the bit. This necessitates suspend drill cuttings in the borehole when the circulation is stopped due to any reason.

Some of the chemicals or additives commonly used as a drilling mud gelling and viscosifying agents are carboxymethyl cellulose (CMC), xanthane and guar gum. However, these commercial drilling additives are subjected to thermal and biological degradation at temperature above approximately 140° C. They are usually mixed with water which should be low in temperature and free of enzyme and bacteria. Furthermore, they are alkaline in pH which requires to be adjusted to desired pH range via pH controlling agent. Thus, these commercial drilling additives will generate environmental problems and increase the toxicity in the drilling field. Drilling workers are probably the most at risk while handling drilling operation. It is even worse when lost circulation problem occurs down-hole, where these toxic materials could enter the formation and contaminate ground water supply.

Due to widespread use of drilling additives in oil and natural drilling activities, environmental and economical concern towards wells development projects are increasingly becoming important in recent years. Efforts are needed to be taken seriously in order to minimize the chance of getting into environmental and economical problems.

There are several patented technologies disclosed in the prior arts relating to drilling mud or its additives. U.S. Pat. No. 4,374,738 relates to a drilling fluid composition which comprises an aqueous dispersion of a clay material containing an effective dispersing amount of a modified lignosulfonate. This modified lignosulfonate is obtained by graft polymerization of from 5 to 30 weight percent of an acrylic compound with the lignosulfonate. However, this invention only aims to provide a chrome-free drilling fluid composition with thermal stability, there is no method provided for preparing a drilling mud additive or composition using a more simple and more environmentally friendly method. The lignosulfonate used in this invention is a calcium-based fermented spent sulfite liquor which is to be processed by a complication procedure.

Another U.S. Pat. No. 5,037,931 also relates to a soluble or crosslinked graft copolymer of lignin acrylamide and hydroxymethacrylate. This graft copolymer is designed to have a particular range of molecular weight suitable for use as thickeners for water and aqueous solutions, recovery of oil from subterranean wells, drilling fluid compositions or in plastics and elastomers. However, this invention only focuses on the preparation of copolymer of lignin using various reagents and percentages, it does not provide any technical guidance on the optimization of the performance of this graft copolymer as a drilling mud additive.

The need of an effective and environmentally friendly gelling and viscosifying agent for drilling mud is increasing due to various economical and environmental concerns. As LGC is deemed a good pH controlling and thermal degradation-resistant gelling and viscosifying agent, it is desirable for the present invention to provide a more innovative, efficient and cost-saving method for preparing the LGC. Besides, an effective formulation of drilling mud containing LGC is also desired. Meanwhile, the problems relating to the environment such as the disposal of oil palm lignocellulosic wastes shall also be overcome by recycling these unwanted materials into valuable products.

SUMMARY OF INVENTION

The primary object of the present invention is to provide a method for producing a gelling and viscosifying agent for drilling mud which is applicable in high temperature hydrocarbon well.

Another object of the present invention is to develop a gelling and viscosifying agent for drilling mud which exhibits good compatibility with commercial gelling and viscosifying agent, environmentally friendly and cost-saving.

Yet another object of the present invention is to provide a composition of drilling mud containing a gelling and viscosifying agent of LGC for uses in drilling engineering industries.

Still another object of the present invention is to optimize the use of lignocellulosic materials from oil palm wastes in the preparation of useful and valuable product, such as a gelling and viscosifying agent for drilling mud.

Further object of the present invention is to create another avenue for innovation and commercialization of agricultural waste materials especially from the oil palm industries.

At least one of the preceding objects is met, in whole or in part, by the present invention, in which one of the embodiments of the present invention describes a method for preparing LGC comprising: reacting lignocellulosic materials with an acrylic compound by bulk condensation under nitrogen atmosphere in the presence of a non-oxidizing strong organic acid as catalyst; separating the reaction mixture to obtain a solid phase mainly containing lignocellulosic materials and a liquid phase containing LGC and unreacted acrylic compound; and removing solvent from the liquid phase to obtain the LGC.

One of the preferred embodiments of the present invention discloses that the lignocellulosic materials are derived from oil palm wastes. Preferably, the acrylic compound is acrylic acid, methacrylic acid, methylmethacrylic acid or any derivatives thereof.

Another preferred embodiment of the present invention discloses that the reaction is performed at a temperature range of 60° C. to 100° C.

Still another preferred embodiment of the present invention discloses that the non-oxidizing strong organic acid is toluenesulfonic acid or benzoic acid.

Preferably, the reaction is terminated by exposing the reaction mixture to air and cooling it into an ice bath. Accordingly, the reaction mixture is separated by zinc sulfate solution.

In yet another preferred embodiment of the present invention, the solvent is removed by evaporating the liquid phase and freeze-drying the LGC.

Still another embodiment of the present invention is use of a lignin graft copolymer in a drilling mud as gelling and viscosifying agent.

Further embodiment of the present invention is a drilling mud comprising 0.3% to 0.7% w/w of the lignin graft copolymer.

Besides providing a LGC as a drilling mud gelling, viscosifying, pH controlling and thermal degradation-resistant agent which is cheaper and more environmentally friendly, the present invention is also capable of overcoming the problems relating to the disposal of oil palm lignocellulosic wastes as well as to recycle the unwanted materials into a valuable product. Noteworthy, none of the lignin polymerization disclosed in the prior arts uses polyesterification process via toluenesulfonic acid. Besides the use of the type of catalyst, the bulk condensation technique applied also plays an important role in the efficiency of the LGC preparation process invented.

One skilled in the art will readily appreciate that the present invention is well adapted to carry out the objects and obtain the ends and advantages mentioned, as well as those inherent therein. The embodiments described herein are not intended as limitations on the scope of the invention.

DETAILED DESCRIPTION OF THE INVENTION

The present invention relates to a method for preparing an additive for drilling mud and the product thereof. In more particular, the present invention provides an innovative method for preparing LGC as a gelling and viscosifying agent for drilling mud and a composition of drilling mud containing this gelling and viscosifying agent.

Hereinafter, the invention shall be described according to the preferred embodiments of the present invention and by referring to the accompanying description. However, it is to be understood that limiting the description to the preferred embodiments of the invention is merely to facilitate discussion of the present invention and it is envisioned that those skilled in the art may devise various modifications without departing from the scope of the appended claim.

The present invention discloses a method for preparing LGC comprising: reacting lignocellulosic materials with an acrylic compound by bulk condensation under nitrogen atmosphere in the presence of a non-oxidizing strong organic acid as catalyst; separating the reaction mixture to obtain a solid phase mainly containing lignocellulosic materials and a liquid phase containing LGC and unreacted acrylic compound; and removing solvent from the liquid phase to obtain the LGC.

According to one of the preferred embodiments of the present invention, the lignocellulosic materials are derived from oil palm wastes. These wastes can be trunks, fronds and empty fruit bunches (EFB). It is known in the art that various suitable methods can be used for the extraction of lignocellulosic materials from this waste, including sulfuric acid method, alkaline method and klason method. In addition, a precipitation technique can also be used to extract lignin from alkaline black liquor. The black liquor can be generated by soaking lignocellulosic wastes and sodium hydroxide in water at a high temperature ranged from 140° C. to 180° C., and pressure ranged from 8 bar to 12 bar, preferably in a steel autoclave. Most preferably, the black liquor is generated at a temperature of 160° C. under a pressure of 10 bar.

Subsequently, the lignocellulosic materials or lignins obtained are polymerized with an acrylic compound to produce the LGC. According to the preferred embodiment of the present invention, the reaction is performed at a temperature range of 60° C. to 100° C. Most preferably, it is performed at 80° C. in an water bath. The present method is characterized by the application of a non-oxidizing strong organic acid as catalyst. A person skilled in the art shall appreciate the fact that any suitable non-oxidizing strong organic acid such as toluenesulfonic acid or benzoic acid can be applied in the present invention to achieve the desired catalyzing effect. In accordance with the most preferred embodiment of the present invention, p-toluenesulfonic acid is used as catalyst.

Still another preferred embodiment of the present invention discloses that the acrylic compound used is acrylic acid, methacrylic acid, methylmetacrylic acid or any derivatives thereof. The reaction is performed by means of bulk condensation. The lignin's bulk condensation technique is conducted on the absence of any solvents that restrict possible solvent effect. Moreover, this technique only requires simple equipments to run the reaction and hence it is preferred due to the economical aspect. As the application of the present technique does not require the use of any solvent during the polymerization process, higher production rate can therefore be obtained by this technique.

In accordance with the preferred embodiment of the present invention, the reaction mixture is heated and stirred during the bulk condensation to allow the grafting of acrylic compound on the lignin. This reaction is terminated by exposing the reaction mixture to atmospheric air and cooling it into an ice bath. The resulting product is then decanted to solution of zinc sulfate in order to be separated into two phases, which are the solid phase and the liquid phase. Zinc sulfate plays an important role in extracting the copolymer from the reaction mixture.

There are two different phases of product obtained from the preparation of LGC as set forth in the preceding description, which includes a solid phase containing unreacted lignin and a liquid phase containing LGC with solvent and unreacted acrylic compound. The solvent is remnant from the mixture of the copolymer and the zinc sulfate. Accordingly, this liquid phase is subjected to a solvent removing process, in which up to 60% of the liquid is removed from this phase. A rotary evaporator is preferably used in this invention for this purpose. In addition, the LCG can be further dried and purified by freeze-drying. An example of the preparation process is further described in Example 1.

Still another embodiment of the present invention is use of a LGC in a drilling mud as gelling and viscosifying agent. This LGC can be incorporated into base mud in different ratio and concentration. Further embodiment of the present invention is a drilling mud comprising 0.3% to 0.7% w/w of the lignin graft copolymer.

The rheological performances of the product as a drilling mud multi functional agent are studied and the findings show that the LGC invented gives good gelling and viscosity building abilities at low dosage of approximately 0.5% w/w. LGC also illustrates excellent compatibility with commercial drilling mud gelling and viscosifying agents at high temperature up to 200° C. Moreover, this product maintains the pH of drilling mud at desired pH range (8.5-10) at various temperature without using pH control agents such as ash soda, caustic soda, sodium bicarbonate, calcium hydroxide and acetic acid. This property will therefore minimize the use of pH controlling agent, which caused environmental problems and increased the cost of drilling operations. These performance studies and evaluation processes are further described in Example 2 to 4.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

EXAMPLE

Examples are provided below to illustrate different aspects and embodiments of the present invention. These examples are not intended in any way to limit the disclosed invention, which is limited only by the claims.

Example 1

A typical method for the preparation of LGC as a gelling and viscosifying agent as described in the preceding embodiments is conducted via graft copolymerization reaction. Initially, the lignin is mixed with acrylic acid in five test tubes and sealed under nitrogen in water bath. Subsequently, p-toluenesulfonic acid is added as a catalyst and the reaction mixture is heated and stirred. This reaction is terminated by opening the tubes to atmospheric air and immersing them into an ice bath. Then, the product is decanted to solution of zinc sulfate. Accordingly, two phases of solution are obtained, including the solid phase with unreacted lignin and the liquid phase containing LGC, solvent and unreacted acrylic acid. This liquid phase is further processed by removing 60% of the liquid therefrom using a rotary evaporator. Lastly, the LGC is further purified by the freeze-drying process.

Example 2

The results of the rheological properties of basic mud with different dosages under difference aging temperatures are tabulated in Table 1. The results obtained are used to highlight the importance of using the correct dosage of treatment for optimization performance of gelling agent and viscosifier as well as to save unnecessary cost. In addition, the use of excessive or insufficient dosage may also bring out negative impact to the mud properties.

TABLE 1

| Types of mud | T(° C.) | $\mu_a$(mPa·S) | $\mu_p$(mPa·S) | $\tau_y$(Pa) | pH | GS(Pa) |
|---|---|---|---|---|---|---|
| Base Mud + 0.3% LGC | 27 | 32.50 | 11 | 21.97 | 10.49 | 75 |
| Base Mud + 0.5% LGC | 27 | 40.00 | 14 | 26.57 | 9.63 | 73 |
| Base Mud + 0.7% LGC | 27 | 45.00 | 15 | 30.66 | 7.45 | 67 |
| Base Mud + 0.3% LGC | 90 | 41.50 | 11 | 31.71 | 10.15 | 95 |
| Base Mud + 0.5% LGC | 90 | 40.50 | 11 | 30.14 | 9.20 | 76 |
| Base Mud + 0.7% LGC | 90 | 43.00 | 11 | 32.70 | 7.22 | 60 |

All test data were measured at 27 ± 1° C., where $\mu_a$ is the apparent viscosity; $\mu_p$ is the plastic viscosity; $\tau_y$ is the yield point; and GS is the gel strength of the drilling mud.

Table 1 shown the optimum dosage of LGC is 0.5% which gave moderate viscosity, gel strength and yield point as well as sufficient pH value compared to others at both temperatures. Two values of temperature were chosen in order to confirm whether the performance of LGC is consistent both at room and high temperatures. An increase of temperature during the drilling operation decreases the drilling mud viscosity and that restricted the transformation of the cuttings from downward to upward. The drilling fluid must have a high enough viscosity to transport the cuttings at minimum velocity from the mud pump.

Example 3

Table 2 shows the comparison study between rheological properties of LGC and commercial drilling mud additives at high temperature 200° C. before and after used for 16 hours.

TABLE 2

| | $\mu_a$(mPa·S) | | $\mu_p$(mPa·S) | | $\tau_y$(Pa) | |
|---|---|---|---|---|---|---|
| Types of mud | Before | After | Before | After | Before | After |
| Base mud + 0.5% LGC | 38 | 58.5 | 13 | 37 | 25.55 | 21.97 |
| Base mud + 0.5% CMC | 97.5 | 25 | 19 | 18 | 61.8 | 7.154 |
| Base mud + 0.5% guar gum | 105 | 23.5 | 35 | 18 | 71.5 | 5.621 |
| Base mud + 0.5% xanthane | 82.5 | 21 | 64 | 16 | 28.1 | 5.11 |

All test data were measured at 27 ± 1° C., where $\mu_a$ is the apparent viscosity; $\mu_p$ is the plastic viscosity; $\tau_y$ is the yield point; and GS is the gel strength of the drilling mud.

As a drilling mud operation takes place downward as drilling mud temperature tends to increase rapidly. This increase influences the mud rheological properties negatively. The negative effect of the increase in the temperature includes severe decrease of drilling mud viscosity and yield point, which makes most of drilling additives not functional at high temperature. From an experimental point of view, CMC, Guar Gum and Xanthane are sensitive to high temperatures (above 140° C.) and biological degradation. These commercial additives also showed inefficiency viscosity building properties at high temperature 200° C. On contrary, LGC showed high capability to improve the viscosity and yield point of the drilling mud at 200° C. Therefore, LGC considers as viscosification agent with excellent thermal stability at high temperature.

Example 4

Another application of LGC is its gelling abilities at both room temperature and high temperature. Table 3 showed a comparative study between LGC and commercial additives in terms of their gelling properties at 200° C. before and after used for 16 hours. The commercial additives showed strongly decrease in their gelling strengths at high temperature. Thus, their abilities to suspend the cuttings tend quickly to reduce at that temperature, which make them insufficient drilling additives at temperature above 140° C. In contrast, LGC maintained the mud gel strength and pH within the desired values in spite of high temperature. As a consequence, this product is successfully exhibited good compatibility with commercial viscosifying and gelling agents.

TABLE 3

| Types of mud | GS (Pa) Before | GS (Pa) After | pH Before | pH After |
| --- | --- | --- | --- | --- |
| Base mud + 0.5% LGC | 73 | 74 | 9.65 | 9.25 |
| Base mud + 0.5% CMC | 96 | 14 | 11.62 | 9.30 |
| Base mud + 0.5% guar gum | 279 | 7 | 11.53 | 8.73 |
| Base mud + 0.5% xanthane | 67 | 4 | 11.62 | 8.64 |

All test data were measured at 27 ± 1° C., where GS is the gel strength of the drilling mud.

The invention claimed is:

1. A method for preparing lignin graft copolymer, comprising:
reacting lignocellulosic materials with an acrylic compound by bulk condensation polymerization under a nitrogen atmosphere in the presence of a non-oxidizing strong organic acid as a catalyst to form a reaction mixture;
separating the reaction mixture to obtain a solid phase containing lignocellulosic materials and a liquid phase containing lignin graft copolymer and unreacted acrylic compound, wherein the liquid phase contains a solvent; and
removing at least a portion of the solvent from the liquid phase to obtain the lignin graft copolymer.

2. The method according to claim 1, wherein the lignocellulosic materials are derived from oil palm wastes.

3. The method according to claim 1, wherein the acrylic compound is selected from the group consisting of acrylic acid, methacrylic acid, methylmethacrylic acid, derivatives of acrylic acid, methacrylic acid, methylmethacrylic acid, and combinations thereof.

4. The method according to claim 1, wherein the reaction is performed at a temperature range of 60° C. to 100° C.

5. The method according to claim 1, wherein the non-oxidizing strong organic acid is toluenesulfonic acid.

6. The method according to claim 1, wherein the reaction is terminated by exposing the reaction mixture to air and cooling it in an ice bath.

7. The method according to claim 1, wherein the reaction mixture is separated by a zinc sulfate solution.

8. The method according to claim 1, wherein the solvent is removed by evaporating the liquid phase and freeze-drying the lignin graft copolymer.

9. The method according to claim 1, wherein the lignin graft copolymer is incorporated into a drilling mud for use as a gelling and viscosifying agent.

10. The method according to claim 9, wherein the drilling mud comprises 0.3% to 0.7% of the lignin graft copolymer.

11. The method according to claim 1, wherein the non-oxidizing strong organic acid is benzoic acid.

12. A method for preparing lignin graft copolymer, comprising:
reacting lignocellulosic materials with an acrylic compound by bulk condensation polymerization under a nitrogen atmosphere in the presence of a non-oxidizing strong organic acid as a catalyst to form a reaction mixture;
wherein the reaction is terminated by exposing the reaction mixture to air and cooling the reaction mixture;
separating the reaction mixture to obtain a solid phase containing lignocellulosic materials and a liquid phase containing lignin graft copolymer and unreacted acrylic compound, wherein the liquid phase contains a solvent; and
removing at least a portion of the solvent from the liquid phase to obtain the lignin graft copolymer.

13. A method for preparing lignin graft copolymer, comprising:
reacting lignocellulosic materials with an acrylic compound by bulk condensation polymerization under a nitrogen atmosphere in the presence of a non-oxidizing strong organic acid as a catalyst to form a reaction mixture;
separating the reaction mixture to obtain a solid phase containing lignocellulosic materials and a liquid phase containing lignin graft copolymer and unreacted acrylic compound, wherein the reaction mixture is separated by a zinc sulfate solution, wherein the liquid phase contains a solvent; and
removing at least a portion of the solvent from the liquid phase to obtain the lignin graft copolymer.

* * * * *